UNITED STATES PATENT OFFICE.

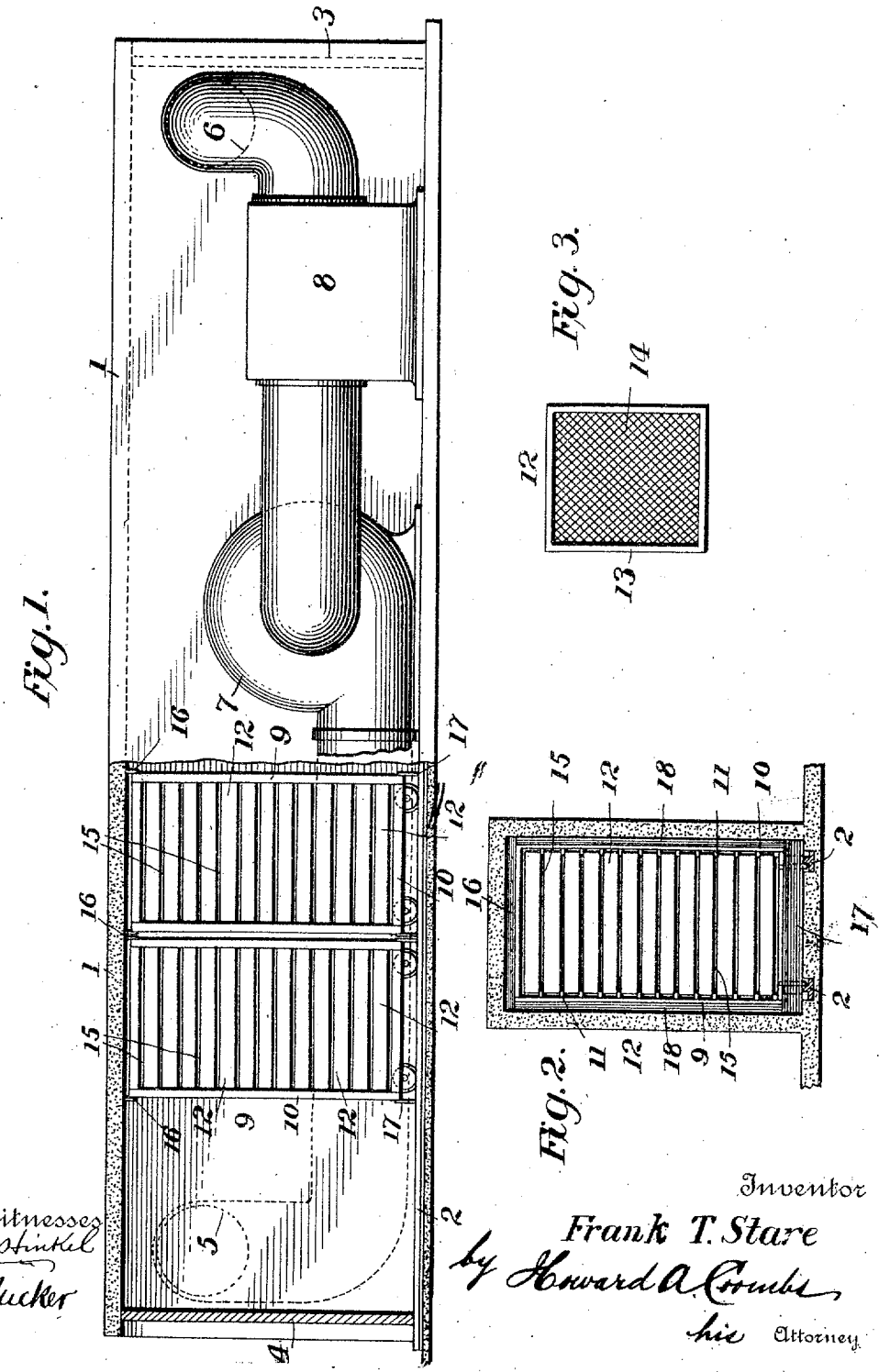

FRANK TEMPEST STARE, OF WAUKESHA, WISCONSIN, ASSIGNOR TO AMERICAN DEHYDRATING CO., OF WAUKESHA, WISCONSIN, A CORPORATION OF WISCONSIN.

DEHYDRATING APPARATUS.

986,602.  Specification of Letters Patent.  Patented Mar. 14, 1911.

Application filed August 17, 1908. Serial No. 448,826.

*To all whom it may concern:*

Be it known that I, FRANK T. STARE, a citizen of the United States, residing at Waukesha, in the county of Waukesha and State of Wisconsin, have invented certain new and useful Improvements in Dehydrating Apparatus, of which the following is a specification.

The object of my invention is an improvement in dehydrating apparatus of the kind described and shown in my Patent No. 872,026 granted Nov. 26, 1907.

In the apparatus therein disclosed, the substances to be dehydrated are laid on trays, which are stacked in trucks, substantially fitting a long tunnel, one truck being introduced at one end of the tunnel as another truck is being taken out at the other end. Warm, dry air is introduced into said tunnel and passed through the material on the trays, first in one direction and then in the other, being then conveyed around through a condenser, one of two air driers and a heater, back again into the tunnel. Automatically operated valves from time to time simultaneously reverse the direction of the air currents through the tunnel and change the path of the air from one drier to the other. I have discovered that this apparatus may be considerably simplified without materially affecting the results obtained in the treatment of many kinds of vegetables and fruits, such as potatoes, onions, cranberries, currants, etc.

The simplified aparatus consists of a tunnel through which the trucks, loaded with trays, are fed in the usual way, the dry air being drawn through the tunnel in the opposite direction from the movement of the trucks. I am aware that there is no novelty in this method of operation *per se*, nor would it be sufficient alone to perform an effective dehydration of the substances, at least within a reasonable time, because a large part of the air would simply flow over the substances on the trays without passing therethrough or penetrating the same sufficiently to withdraw the water expeditiously. I have overcome this difficulty, however, by so proportioning the vertical spaces between the solid ends of the stacked trays that the combined area of such spaces in each tier is considerably less than that of the combined spaces between the material on the tray bottoms and the tray bottoms above. The consequence of this is, and herein lies the essence of my invention, that the air travels at an increased velocity as it passes through the spaces between the ends of the trays, and immediately thereafter spreads out in the larger space and is diverted from a straight path and flows upwardly and downwardly penetrating into the material lying on the tray bottoms, both from below and above, whereby substantially the same excellent results are obtained as by first passing the air downwardly through the trays and then reversing its direction and sending it upwardly therethrough.

The invention is illustrated in the accompanying drawing, in which—

Figure 1 is a partial longitudinal section and partial elevation of the tunnel, showing the pipe connections, blower and heater. Fig. 2 is a cross-sectional view of the tunnel, the air-pipe and connections not being shown. Fig. 3 is a plan view of one of the trays. In both Figs. 1 and 2 the trucks are shown as charged with trays.

1 represents the tunnel, which is built of brick or concrete, and is provided with a track, sunken in its floor. One end of the tunnel is closed by a door 3, and the other by a similar door 4. Near the door 4 is an air inlet 5, while near the other door 3, is an outlet 6, the air being drawn through the tunnel by the blower 7. in the opposite direction to that in which the trucks are fed through. After passing through the tunnel, the air is passed through the heater 8 and returned to the tunnel. The trucks 9 are provided with wheels, which run on the aforesaid track, and consist of an open frame-work 10, preferably of wood, of a size to substantially fit the tunnel. Cleats 11, are secured on the sides of the trucks and on these cleats are removably supported the trays 12, which carry the substances to be dehydrated. The trays consist of a solid board frame-work 13, and a reticulated bottom 14, of wire-gauze or the like. They are supported in the trucks, as I have said, on the cleats 11, which are so spaced as to leave a certain distance between the vertical ends of the trays, as shown at 215, Fig. 2. The combined area of these spaces 15 in each tier of trays is not more than one-fourth as great as the combined area of a cross section of the spaces between the material on the trays and the tray bottoms above.

To prevent air from passing along the walls of the tunnel outside the trucks, the top of the tunnel is provided, at intervals equal to the length of a truck, with depending flaps 16 of felt or the like, and the bottom of each truck has at one or both ends similar depending flaps 17, which close the apertures between the bottom of the trucks and the floor. Either the sides of the trucks or the walls of the tunnel are likewise provided with packing strips 18 to close the spaces there.

The operation is as follows:—Assuming the tunnel to be filled with loaded trucks, introduced at the door 3, air is sucked out of the outlet 6 and, after passing through the heater 8, is reintroduced into the tunnel at the inlet 5. In some cases, fresh air may be used instead of the air coming from the tunnel. The air entering the tunnel at the inlet 5 flows laterally over and under the trays in the truck which stands directly opposite said inlet, and passes through the spaces 15 between the solid ends of the trays of the next succeeding truck. The combined area of these spaces being less than the area of the passage on either side of them, the air moves at a higher velocity in passing through the said spaces, and it is immediately thereafter deflected, thus forcing its way into and through the material on the trays in said second truck. The aforesaid packing strips prevent the air from passing around the trucks, and the said operation is performed in each successive tier of trays, until the air, loaded with moisture, is drawn out at the outlet 6. After a certain time, depending on the nature of the material being treated and on the temperature and humidity of the air, the doors 3 and 4 are opened, a truck is taken out of the door 4 with the material thereon completely dehydrated and a truck loaded with fresh material is pushed in at the door 3, the line of trucks being thereby advanced by a distance equal to one of them. The operation is a continuous one and is only varied as made necessary by a change in the substances being dehydrated.

Under some conditions as stated, it is unnecessary to use the air in a closed circuit, as described, outside air being used after having been drawn through the heater. But the method and means for supplying the air form no part of my present invention, which is defined in the following claims:—

1. An apparatus for dehydrating food-substances, comprising a tunnel having a track along its floor and provided with air-inlet and air-outlet openings at its ends, trucks substantially fitting said tunnel, provided with wheels to run on said track, and with spaced supporting cleats on their sides, trays, having reticulated bottoms and solid ends, supported on said cleats, the total area of the vertical spaces between the ends of the stacked trays being less than the cross-section of the tunnel through the bottoms of the trays between their ends, and means to force air through the tunnel from the opposite end to that in which the trucks are introduced.

2. A dehydrating apparatus comprising a tunnel, having an air-inlet at one end and an air outlet at the other and a track on its floor, trucks substantially fitting said tunnel and running on said track, trays, having reticulated bottoms and solid ends, supported in said trucks so as to leave spaces between their ends, a blower, pipes connecting said blower to said inlet and outlet openings, and a heater in one of said pipes, the vertical spaces between the ends of the trays being so dimensioned as to cause the air to flow more rapidly as it passes through said spaces and consequently to pass upwardly and downwardly through the tray bottoms.

3. A dehydrating apparatus comprising a rectangular tunnel, provided with doors at its ends and a track in its floor, trucks of substantially the size of the tunnel, and provided with wheels to run on said track, cleats secured at regularly spaced intervals to the sides of said trucks, trays, having solid ends and sides and reticulated bottoms, adapted to be supported on said cleats, the vertical height of the sides and ends of said trays being greater than the distance between the adjacent ends of the trays by an amount such that the combined area of the vertical spaces between adjacent tray ends on a truck is considerably less than that of the combined area of the air-passages through the body of the trucks, and packing strips to prevent the air from passing along the wall of the tunnel outside of the trucks.

In testimony whereof I have affixed my signature, in presence of two witnesses.

FRANK TEMPEST STARE.

Witnesses:
D. M. DAVISON,
C. H. JACOB.